US008666726B2

(12) United States Patent (10) Patent No.: US 8,666,726 B2
Tremblay et al. (45) Date of Patent: Mar. 4, 2014

(54) SAMPLE CLUSTERING TO REDUCE MANUAL TRANSCRIPTIONS IN SPEECH RECOGNITION SYSTEM

(75) Inventors: Real Tremblay, Outremont (CA); Jerome Tremblay, Montreal (CA); Alina Andreevskaia, Montreal (CA)

(73) Assignee: Nuance Communications, Inc., Burlington, MA (US)

( * ) Notice: Subject to any disclaimer, the term of this patent is extended or adjusted under 35 U.S.C. 154(b) by 556 days.

(21) Appl. No.: 12/974,638

(22) Filed: Dec. 21, 2010

(65) Prior Publication Data

US 2012/0158399 A1 Jun. 21, 2012

(51) Int. Cl.
 *G06F 17/28* (2006.01)
(52) U.S. Cl.
 USPC ............................................................ 704/4
(58) Field of Classification Search
 USPC .............................. 704/4, 243–245, 251–252; 379/67.1–70, 71, 75, 88.01–88.06; 715/728
 See application file for complete search history.

(56) References Cited

U.S. PATENT DOCUMENTS

| 7,280,965 | B1* | 10/2007 | Begeja et al. .................. 704/257 |
| 7,606,714 | B2* | 10/2009 | Williams et al. .............. 704/275 |
| 2004/0117725 | A1* | 6/2004 | Chen et al. ..................... 715/500 |
| 2004/0117740 | A1* | 6/2004 | Chen et al. ..................... 715/531 |
| 2005/0105712 | A1* | 5/2005 | Williams et al. .......... 379/265.02 |
| 2006/0080107 | A1* | 4/2006 | Hill et al. ....................... 704/275 |
| 2006/0212294 | A1* | 9/2006 | Gorin et al. .................... 704/245 |

* cited by examiner

*Primary Examiner* — Michael N Opsasnick
(74) *Attorney, Agent, or Firm* — Wolf, Greenfield & Sacks, P.C.

(57) ABSTRACT

Techniques for grouping a plurality of samples automatically transcribed from a plurality of utterances. The method comprises forming clusters from the plurality of samples, wherein the clusters include two or more of the plurality of samples. One or more samples are selected from a cluster and manually-processed data samples for the one or more samples are obtained. A weighting factor may be assigned to the data samples based, at least in part, on the number of samples in the cluster associated with the selected data sample.

26 Claims, 7 Drawing Sheets

SAMPLE CLUSTERING TO REDUCE MANUAL TRANSCRIPTIONS IN SPEECH RECOGNITION SYSTEM

BACKGROUND

The development of some types of automatic speech recognition (ASR) systems or speech recognition applications involves the use of large sets of audio data that conventionally require manual transcription (i.e., transcription by one or more humans). One example of such a speech processing application is one that uses natural language understanding to enable a speech engine to recognize a user's utterance. To ensure that such applications correctly identify an utterance, natural language understanding systems typically are trained using a large corpus of transcribed and classified responses to an open-ended prompt, such as "How may I help you?" An example is a call routing application, which uses statistical-based natural language understanding to direct incoming calls to a particular destination based on information provided by a user. A call routing application may be trained to route calls by providing the application with a large corpus (e.g., 20,000-40,000 samples) of user requests and hand coded results (e.g., desired destinations). Such a large corpus is typically used to ensure that the application learns how to generalize user inputs are that most user inputs are routed properly.

Another type of ASR system that typically employs a large manually transcribed data set is one employing an updatable grammar. Some speech processing applications use one or more grammars to constrain the possible sequences of words recognized by the system. However, grammars written by an application developer for a particular application may not include all of the utterances that a user may say in response to interactions with the system, leading to poor speech recognition. Speech recognition may be improved by extending the grammar to include additional words or phrases that were not included in the original grammar provided by the application developer, but which a user is likely to say. Typically, a large set of actual user responses may be collected and manually transcribed and the manually transcribed responses may be used to update the grammar to include any words or phrases not already in the grammar.

SUMMARY

One embodiment is directed to a method of processing a plurality of training samples for an automatic speech recognition (ASR) application. The method comprising acts of forming at least one cluster from the plurality of training samples, the at least one cluster including a number of the plurality of training samples, wherein the number equals two or more; selecting at least one training sample from the at least one cluster; obtaining at least one manually-processed data sample resulting from manual processing of the selected at least one training sample in the at least one cluster; and assigning, to the at least one manually-processed data sample, a weighting factor based, at least in part, on the number of training samples in the cluster associated with the selected at least one manually-processed data sample.

Another embodiment is directed to at least one non-transitory computer readable storage medium encoded with a plurality of instructions that, when executed by a computer, perform a method of processing a plurality of training samples for an automatic speech recognition (ASR) application. The method comprises acts of forming at least one cluster from the plurality of training samples, the at least one cluster including a number of the plurality of training samples, wherein the number equals two or more; selecting at least one training sample from the at least one cluster; obtaining at least one manually-processed data sample resulting from manual processing of the selected at least one training sample in the at least one cluster; and assigning, to the at least one manually-processed data sample, a weighting factor based, at least in part, on the number of training samples in the cluster associated with the selected at least one manually-processed data sample.

Another embodiment is directed to a computer system, comprising: at least one storage device configured to store a plurality of instructions; and at least one processor programmed to execute the plurality of instructions to perform a method comprising acts of forming at least one cluster from the plurality of training samples, the at least one cluster including a number of the plurality of training samples, wherein the number equals two or more; selecting at least one training sample from the at least one cluster; obtaining at least one manually-processed data sample resulting from manual processing of the selected at least one training sample in the at least one cluster; and assigning, to the at least one manually-processed data sample, a weighting factor based, at least in part, on the number of training samples in the cluster associated with the selected at least one manually-processed data sample.

Another embodiment is directed to a method for updating a grammar using a plurality of data samples. The method comprises forming, with at least one processor, a cluster including at least two data samples of the plurality of data samples based, at least in part, on a similarity between the at least two data samples; selecting at least one data sample from the cluster; determining whether the at least one data sample is covered by the grammar; and updating the grammar based, at least in part, on the at least one data sample, when it is determined that the at least one data sample is not covered by the grammar.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
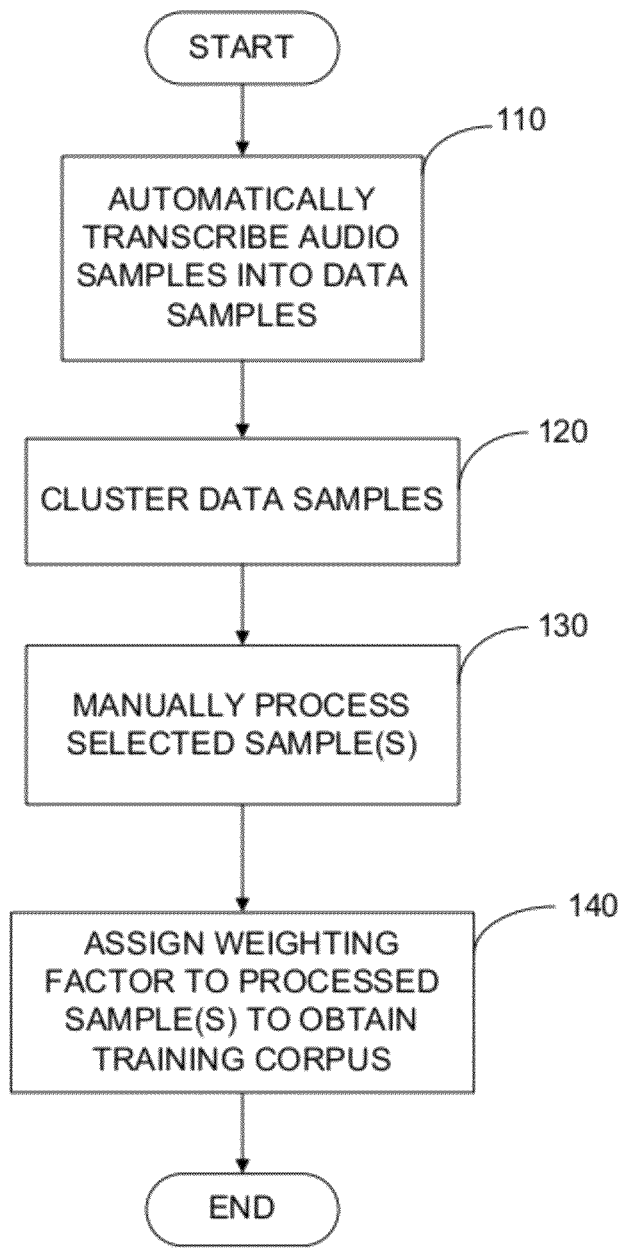
FIG. 1 is a flow chart of a method for generating a corpus for a natural language understanding system in accordance with some embodiments of the invention.

As described above, generating a large manually-transcribed corpus for an ASR application is typically a resourceintensive and time-consuming task requiring significant human involvement. For example, for an NLU system, manual effort typically is required to transcribe user input and to associate a semantic meaning with each user input. For example, a call routing application may direct calls to a particular destination based on the content of an incoming call, and the associated semantic meaning may involve a hand coding to identify the appropriate destination to which to route each call. Thus, in addition to transcribing samples provided to such applications, the samples are also manually annotated to enable the application to learn how to perform the particular action (e.g., routing calls) when provided with a particular input utterance. The large number of samples to be manually transcribed and annotated adds to the expense in development of and time to market for speech recognition applications requiring such an extensive amount of human involvement.

As described above, a significant amount of human involvement also is often required to extend a grammar to include items not specified by an application developer for a particular ASR application. A large set of actual user responses to a prompt typically is collected to capture a wide range of potential user responses that the ASR application should recognize. Each of the responses may be manually transcribed and the transcriptions may be sent to a parser to compare the responses to the existing grammar to determine which of the responses are not already covered by the grammar. The set of responses that are not covered by the grammar may be analyzed to determine if the grammar should be extended to include additional terms (e.g., words or phrases) in the unrecognized responses.

Applicants have recognized that there often is a significant amount of redundancy in the samples that are manually processed and that existing methods of manually transcribing and/or annotating input data sets for ASR systems may be improved by clustering redundant samples together prior to manual processing to exploit this redundancy. A relatively small number (e.g., one, two, ten, or any relatively small number) of representative samples from each cluster may then be manually processed, and no manual processing need be performed for the remaining samples in the cluster, as the manual processing is equally applicable to all of the redundant samples in the cluster. For example, in some embodiments, the number of representative samples selected from each cluster may be equal to $\log_4 N$, where N is the number of samples in the cluster. By processing a single exemplar (or a few exemplars) for each cluster of transcribed samples, the amount of manual processing necessary to generate a large set of data for an ASR application is substantially reduced.

In some embodiments, all samples in a cluster may be associated with the manual processing result for the exemplar(s) to ensure that the number of samples in the cluster are taken into account when training an ASR system. Keeping track of the size of clusters enables manual processing results associated with large clusters to be given more weight during the training process than manual processing results associated with smaller clusters. The samples in a cluster and the associated manual processing result may be associated in any suitable way, as embodiments of the invention are not limited in this respect. For example, samples in a cluster may be associated with an identifier that identifies the representative manual processing results and/or manual processing results may each be associated with a weighting factor representing the size of their associated cluster.

In some embodiments, audio samples collected in response to a prompt may be processed to generate a corpus of training data for a natural language understanding system. The audio samples may be acquired in any suitable way, as the embodiments of the invention described herein are not limited in this respect. For example, for a call routing application, the audio samples may be recorded answers to an open prompt such as "How may I direct your call?" at a call center main number. The number of audio samples collected for the corpus should be large enough to ensure an acceptable degree of performance for a particular application when trained by the corpus, and may be similar to the number conventionally employed or be any suitable number.

A process for generating a corpus for a natural language understanding system in accordance with some embodiments of the invention is illustrated in FIG. 1. In act 110, audio samples collected in response to a prompt may be automatically transcribed to generate text representations for the audio samples. Any suitable automatic transcription technique may be used, as embodiments of the invention are not limited in this respect. For example, in some embodiments, the automatic transcription technique described in U.S. Patent Publication No. 2010/0023331 (assigned to Nuance Communications, Inc.) may be used for generating automated transcriptions. Briefly, in this technique, a general language model and call routing data are used to build an initial bootstrap statistical language model (SLM) for speech recognition. The SLM is used to recognize audio data and a second cross-validation recognition and SLM training is used to optimize aspects of the SLM. The trained SLM may then be used by a speech recognition system to provide automatic transcriptions for audio samples received as input. Automatic transcription processes in accordance with some embodiments of the invention may provide transcriptions with varying degrees of accuracy and embodiments of the invention are not limited by the performance of any particular automatic transcription process or technique that is employed. For example, in some embodiments, an automatic transcription process may perform an initial recognition of an audio signal with a speech recognition result that may not be of sufficient accuracy for an ASR application, but nonetheless may be suitable for facilitating clustering as described below.

In act 120, the samples provided by an automatic transcription process are grouped or clustered according to one or more rules (examples of which are described below) that specify how to group the samples into clusters for further analysis. By forming clusters of samples, similar (or identical) samples may be identified and some subset of them (e.g., one or any number less than the total number in the cluster) may be selected as a representative of the cluster. The representative samples(s) may be selected using any suitable technique including, but not limited to, random selection from the cluster, as embodiments of the invention are not limited in this respect. Specific examples of clustering rules in accordance with some embodiments of the invention are described in more detail below.

In act 130, at least one manual processing operation may be applied to the one or more samples selected from each cluster. Any manual processing operation suitable to the ASR system for which the corpus is being developed may be applied to the selected sample(s), as embodiments of the invention are not limited in this respect. In some embodiments, an audio sample associated with the selected sample(s) may be manually transcribed to ensure that an accurate transcription of the audio sample is obtained to avoid the risk that the automatic transcription process did not accurately transcribe the sample. In other embodiments, the selected sample(s) may be manually annotated or coded if desirable or useful for the particular ASR application. For example, samples associated with a call routing application may be manually annotated to associate a particular destination for the call with the transcription of the caller's stated destination.

After performing manual processing on the one or more selected samples from each cluster, the process proceeds to act 140, in which a weighting factor may be assigned to the one or more selected samples, wherein the weighting factor is based on the number of samples in the cluster to which the selected sample belongs. In essence, the weighting factor (or "cluster count") represents how much weight the particular sample should have in the corpus as a whole, as it may be valuable in some embodiments for the training data to reflect the actual number of collected samples so that the leveraging of redundancy in the data set to reduce the manual workload does not impact how the system is trained. As discussed above, in existing systems for generating a training corpus for a natural language understanding system, each of the samples output from the automatic transcription process would be manually operated on. However, in some embodiments of the present invention, a smaller number (which may be one, a few exemplars, or any number smaller than the number of samples in the cluster) of samples are manually processed.

As discussed above, a suitable number of input samples may be selected from a cluster for manual processing, as embodiments of the invention are not limited in this respect. In some embodiments, only a single input sample from each cluster may be selected for manual processing. However, in other embodiments, multiple samples may be selected from each cluster to provide robustness against clustering error (i.e., misclassifying a sample that doesn't belong with the cluster) and the risk of selecting a misclassified sample to represent the cluster. In some embodiments, the number of samples selected from a cluster for manual transcription may be based, at least in part, on the size of the cluster. For example, in some embodiments, the number of samples may be selected in accordance with the formula $m=\log(N)$, where m is the number of selected samples and N is the number of samples in the cluster. Thus, for a cluster with five-hundred samples, $m=2.7$, so three samples may be selected, whereas for a cluster with ten samples, $m=1$, so only a single sample may be selected. By selecting multiple samples from larger clusters, the clustering process may have more robust resistance to "outliers" that may have been improperly included in the cluster.

In some embodiments of the invention, it may be advantageous for a training corpus created using the clustering process to be similar to a conventional training corpus. One way to achieve this similarity is to assign to one or more of the input samples in the cluster the same manual processing result (e.g., the same transcription and/or annotation) that was determined for the selected sample for that cluster, and to have every sample appear separately in the training corpus.

Alternatively, the training corpus itself may comprise only the selected samples for each cluster, with one or more of the selected samples being associated with a weighting factor representing the size of the cluster from which the sample was selected. For example, if a selected sample was selected from a cluster having five-hundred samples, the selected sample may be assigned a weighting factor of five hundred, whereas a selected sample from a cluster having fifty samples may be assigned a weighting factor of fifty. In embodiments in which multiple samples are selected from each cluster, the weighting factor for the cluster may be divided by the number of selected samples and the divided weighting factor may be applied to each of the selected samples in the cluster. For example, if three samples ($m=3$) are selected from a cluster having six-hundred samples ($N=600$), each of the selected samples may be included in the training corpus with an assigned weighting factor of N/m or two hundred. In this respect, selected samples taken from larger clusters may be given more weight in the training corpus than samples selected from smaller clusters. By scaling the selected samples in this manner, the resulting training corpus closely approximates the results from existing systems in which each of the samples is manually processed to produce the training corpus.

Figure 2:
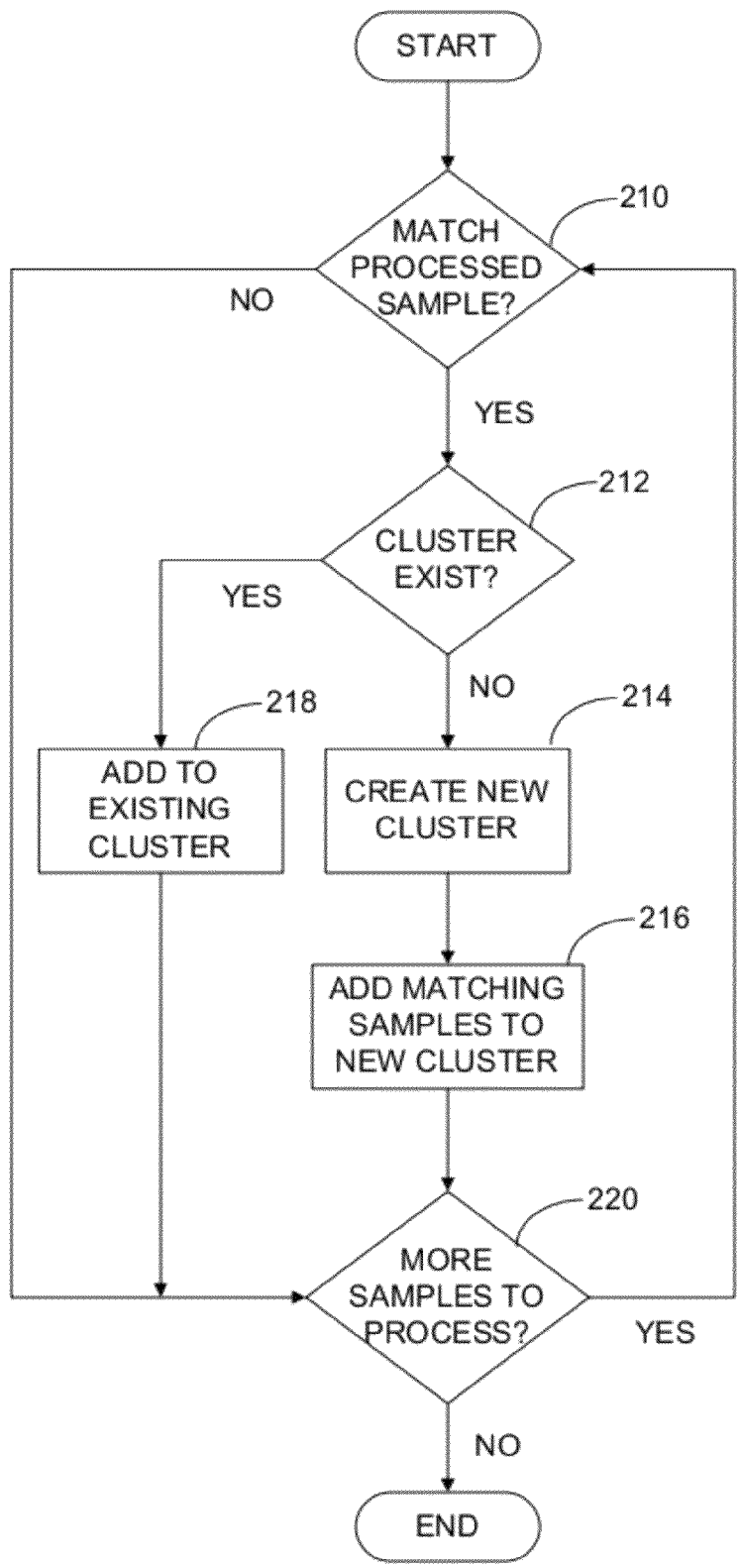
FIG. 2 is a flow chart of a method for grouping matching samples in accordance with some embodiments of the invention.

As described above, input data samples automatically transcribed or processed in another suitable manner may be grouped into clusters using one or more rules. Any suitable rules may be used, as aspects of the invention are not limited in this respect. An exemplary clustering process in which clusters of identical samples are grouped is illustrated in FIG. 2. In act 210, it is determined whether a sample currently being processed matches (i.e., is identical to) one or more previously processed samples. Determining whether a sample matches previous sample(s) may be performed in any suitable way, as aspects of the invention are not limited in this respect. For example, for text samples, a word to word comparison of previously processed samples with the sample currently being processed may be performed to determine if the sample matches any of the previously processed samples. If it is determined in act 210 that the sample matches at least one previously processed sample, the process proceeds to act 212, in which it is determined whether the previously processed matching sample is already a member of a cluster. If it is determined in act 212 that the previously processed matching sample is a member of an existing cluster, the process proceeds to act 218, where the currently processed sample may be added to the existing cluster that includes the previously processed matching sample. Otherwise, if it is determined in act 212 that the previously processed matching sample is not a member of a cluster, the process proceeds to act 214, where a new cluster may be created. The process then proceeds to act 216, where the two matching samples (i.e., the currently processed and the previously processed samples) may be added to the newly formed cluster.

When it is determined in act 210 that the existing sample does not match any previously processed sample, or after the currently processed matching sample is added to an existing cluster in act 218 or to a new cluster in act 216, the process proceeds to act 220, where it is determined whether there are additional samples to process. In some embodiments, unique samples that do not match any previously processed samples may form a cluster of size one. Such clusters may or may not be included in a manual transcription process, described in more detail below. In one implementation, when clusters of size one are included in the manual transcription process, only a subset of the clusters of size one may be selected for manual transcription. For example, clusters of size one may be added to the total number of samples to be manually transcribed until a desired number of samples for manual processing are selected.

If there are additional samples, the process returns to act 210, where one of the remaining samples is selected as the currently processed sample. The matching procedure continues until it is determined in act 220 that all of the samples have been processed. Although the clustering process shown in FIG. 2 has been described as processing a plurality of samples in a serial manner, it should be appreciated that the plurality of samples may be processed in any other way that enables matching samples to be identified and clusters of the matching samples to be formed. For example, samples may be processed serially, in parallel, or some combination thereof. Additionally, embodiments of the invention are not limited by the particular manner in which clusters are formed. For example, clusters may be formed by associating matching samples with metadata or some other identifier that designates the samples' inclusion in a particular cluster. Alternatively, samples belonging to different clusters may be stored in different portions of memory that are assigned to the clusters, or may be associated in any other suitable way.

Figure 3:
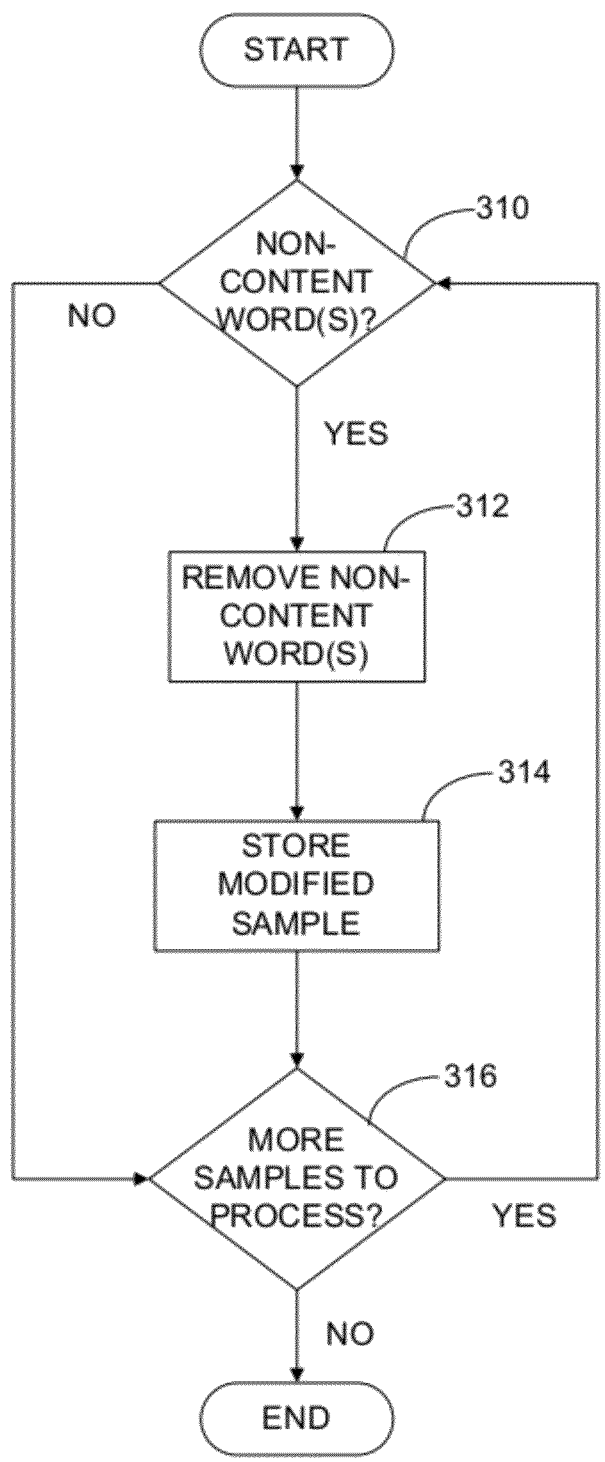
FIG. 3 is a flow chart of a method for identifying and removing non-content words and sounds in samples in accordance with some embodiments of the invention.

In some embodiments, samples may include one or more words that are not substantive (e.g., do not contribute to the semantic content of the sample). FIG. 3 illustrates a process for identifying and removing non-content words from samples. Removing non-content words facilitates the identification of samples that are identical in substantive content even though the samples may have some minor wording differences. In act 310 it is determined whether a currently processed sample contains one or more non-content words. Identification of non-content words in a sample may be performed in any suitable manner, as aspects of the invention are not limited in this respect. For example, words or sounds such as hesitations (ah, ehh, etc.), noise, or repetitions (e.g., "I want to view my account account") may be identified as non-content words. If it is determined in act 310 that the sample includes at least one non-content word, the process proceeds to act 312, where the at least one non-content word may be removed from the sample. The process then proceeds to act 314, where the modified sample (having non-content words removed) may be stored for further processing.

After storing the modified sample in act 314 or if it is determined in act 310 that there are no non-content words in the sample, the process proceeds to act 316 where it is determined whether there are more samples to process. If it is determined in act 316 that there are more samples, process control returns to act 310 and a new sample is processed to determine if the sample includes one or more non-content words. The process continues until it is determined in act 316 that all of the samples have been processed. Identifying and removing non-content words from samples may be performed prior to a clustering process such as that described in connection with FIG. 2, or as an additional analysis pass of the samples after a clustering process has been performed, as aspects of the invention are not limited in this respect. For example, in some embodiments clusters may be processed to determine if any of the samples in a cluster includes non-content words. If non-content words are identified in any of the samples, the non-content words may be removed and a clustering process may be repeated, if desired.

In some embodiments, a corpus of samples may include two or more words and/or phrases that may be identified and mapped to common word or phrase (referred to herein as a "simple synonym") to facilitate a clustering process as described herein. Relationships for simple synonyms may be described as one or more stored mappings between related words and/or phrases. For example, a mapping Want ->(I want to), (I would like to), ( . . . ) may indicate that all instances of "I want to" and "I would like to" in a sample should be replaced with the simple synonym "Want." Any number of mappings may be stored and used in a simple synonym identification and mapping process, as aspects of the invention are not limited in this respect.

Figure 4:
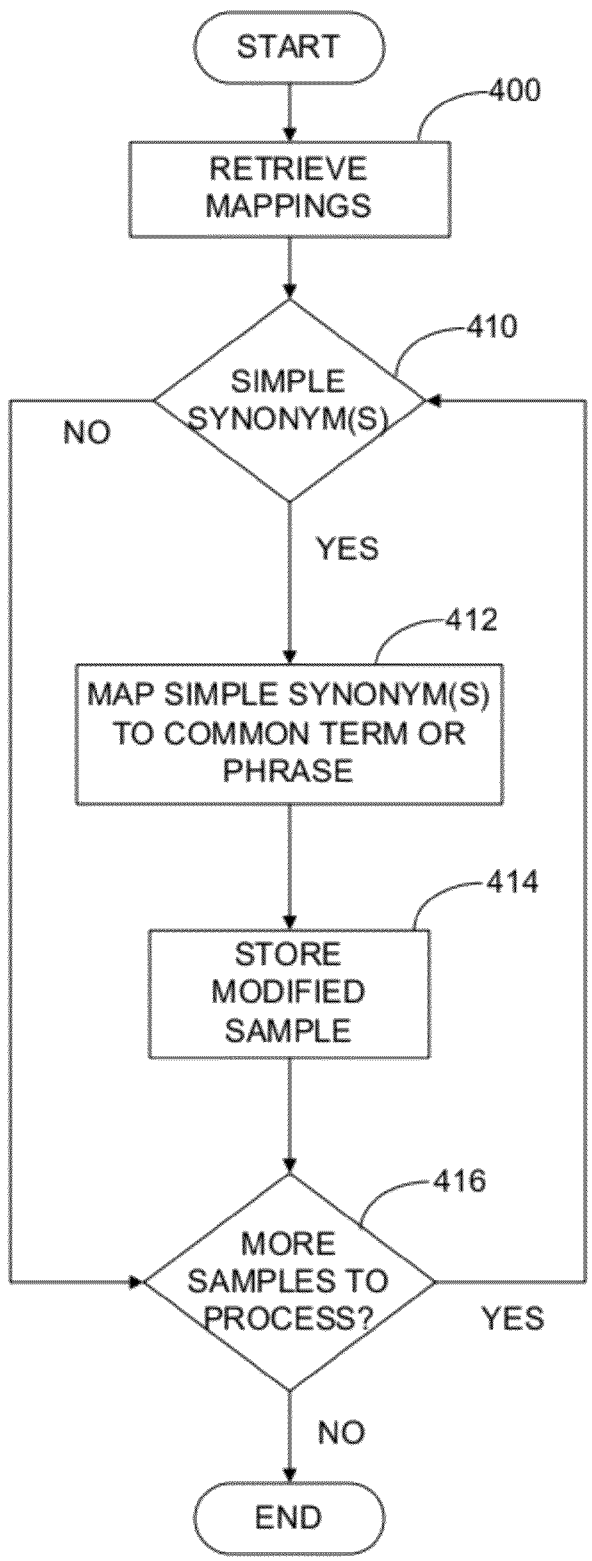
FIG. 4 is a flow chart of a method for identifying and mapping simple synonyms in samples in accordance with some embodiments of the invention.

An exemplary process for identifying and mapping words and/or phrases to simple synonyms in a plurality of samples is illustrated in FIG. 4. In act 400, one or more stored mappings that define relationships between simple synonyms may be retrieved from storage. In act 410, a sample is processed to determine whether the sample includes words or phrases that map to at least one simple synonym as defined in the retrieved mappings. If it is determined in act 410 that the sample includes such words or phrases, the process proceeds to act 412, where the words or phrases may be mapped to a simple synonym as defined by the associated mapping. For example, the sample "I want to cancel my voicemail" and "I would like to cancel my voicemail" may both be mapped to "Want cancel voicemail," provided that a mapping Want ->(I want to), (I would like to), ( . . . ) is specified. For text-based samples, the text in the sample may be replaced with text corresponding to the label for the simple synonym defined in the associated mapping. However, it should be appreciated that the manner in which an identified synonymous term or phrase is mapped to a common label may be dependent on the particular format of the sample and/or the stored mapping. For example, for audio-based samples, synonymous words or phrases identified in the audio samples may be replaced with stored audio recordings for the common label. After mapping the detected word and/or phrase to the corresponding simple synonym, the process proceeds to act 414, where the modified sample may be stored for further processing. In some instances, a sample may include multiple words that may map to different simple synonyms. Accordingly, in some embodiments, a single sample may be processed multiple times to map the multiple detected words and/or phrases to the corresponding simple synonyms.

After the modified sample has been stored in act 414 or if it is determined in act 410 that the sample does not include a simple synonym, the process proceeds to act 416, where it is determined whether there are additional samples to process. If it is determined in act 416 that there are more samples, the process returns to act 410 and a new sample is processed in the manner discussed above. The process continues until all of the samples have been processed. Mapping words and/or phrases in samples to simple synonyms may be performed prior to a clustering process such as that described in connection with FIG. 2 to increase the number of samples clustered together, or alternatively as an additional analysis pass of the samples after a clustering process has been performed to, for example, collapse multiple clusters into one cluster, as aspects of the invention are not limited in this respect.

Figure 5:
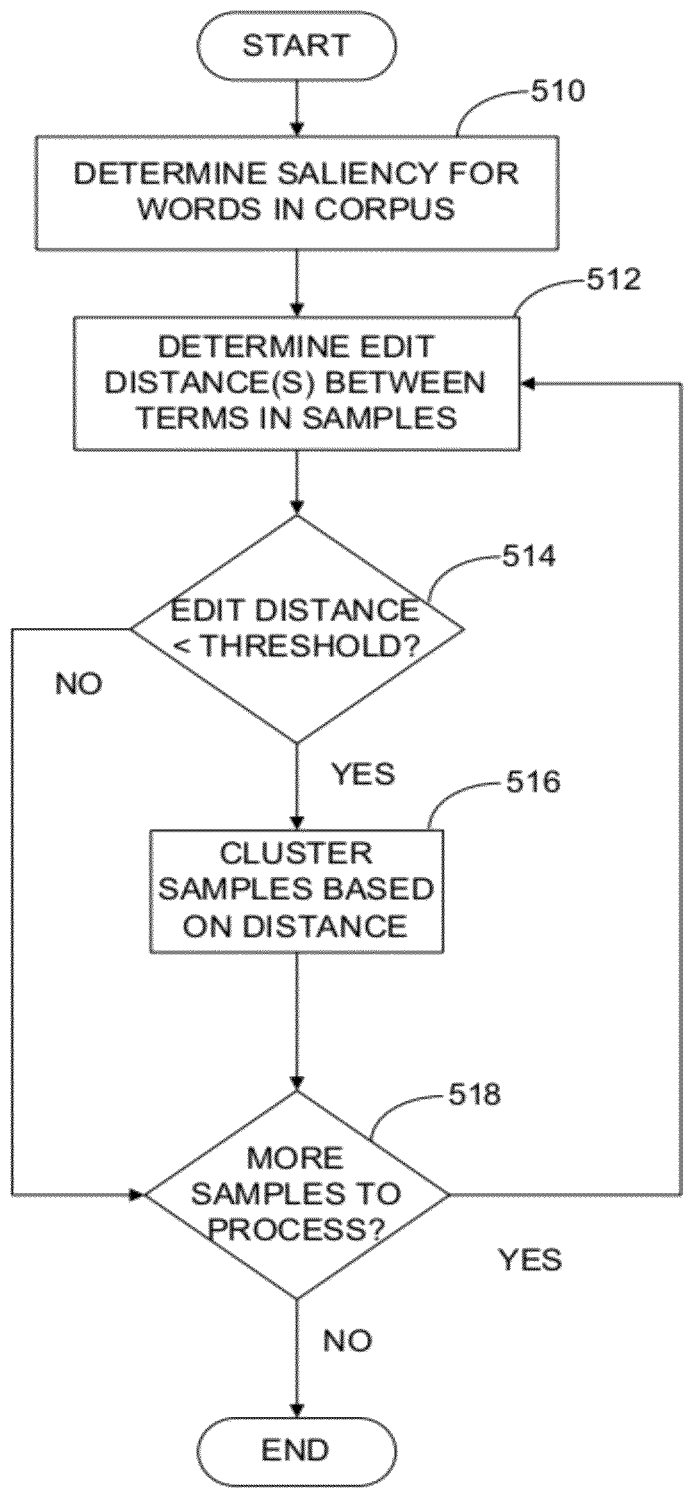
FIG. 5 is a flow chart of a method for grouping similar samples in accordance with some embodiments of the invention.

In some embodiments, one or more semantic analyses may be performed to identify one or more words in a sample that contain little to no salient information for performing a particular task (e.g., call routing). The saliency information may be used to bias a clustering process as described in more detail below. It should be appreciated that any semantic analysis may be used, as embodiments of the invention are not limited in this respect. An exemplary process for clustering samples based on saliency information is illustrated in FIG. 5. In act 510, a measure of saliency for words in a corpus may be determined. For example, for a call routing application, the probability that a particular word or phrase is related to any of the relevant destinations may be determined. This determination may be made in any suitable way, as embodiments of the invention are not limited in this respect. For example, the presence of particular words or phrases in a sample that has been successfully routed to a destination may be analyzed to determine a saliency measure for the particular words or phrases.

In some embodiments, a measure of saliency for a word or phrase in a corpus may be determined by analyzing multiple corpora or speech recognition applications in a speech recognition system to provide a more larger sample set for determining saliency of words or phrases. From this analysis, it may be determined that some words are associated strongly with a semantic meaning (e.g., with one or more destinations), whereas other words are not associated with any semantic meaning. Words that are highly predictive of a semantic meaning may be considered to have a high saliency value and words that are not associated with a semantic meaning may have a low saliency value. For example, the word "checking" may be strongly correlated with a destination (e.g., a checking account), whereas the word "account" may not be highly predictive of any destination for routing a call.

Once saliency values have been determined for the words in the corpus, samples may be grouped into clusters using the saliency values to bias the clustering process. For example, clusters may be formed based on the similarity of samples, where the evaluation of the similarity of samples considers the saliency values associated with the words in the samples. One exemplary method of determining a similarity of two samples is to compute an edit distance between the two samples. In act 512, a sample may be selected and an edit distance (e.g., a Levenshtein distance) may be calculated between the selected sample and a previously processed sample to determine a similarity of the samples. In some embodiments, rather than simply performing a word-by-word comparison of the two samples to determine an edit distance, the saliency measures assigned to the words in the samples may be used to bias the edit distance determination. For example, words that have low saliency values may be given less consideration in the edit distance determination than words with high saliency values. That is, in determining the similarity of two samples, words that are highly predictive of a semantic meaning (e.g., a destination) may be given more weight than words that are not predictive of any semantic meaning. Thus, the edit distance determination may be weighted to more strongly consider similarities between words with high saliency values and ignore discrepancies between words with low saliency values.

After determining an edit distance for two samples, the process proceeds to act 514, where it may be determined whether the edit distance is below a predetermined threshold. If it is determined that the edit distance is below a predetermined threshold, the process proceeds to act 516, where the two samples may be included in a cluster. However, if it is determined in act 514 that the edit distance is above the predetermined threshold, the samples may not be included in a cluster and the process control proceeds to act 518, where it is determined whether there are more samples to process. If it is determined that there are more samples, process control returns to act 512 and a new sample is selected. The cluster process continues until it is determined in act 518 that the plurality of samples all have been processed.

Although the processes in FIGS. 2-5 are shown as being independent processes, it should be appreciated that the illustrated processes for clustering samples (and any other suitable variants on the clustering processes not shown) may be used alone or in combination and in any order, as embodiments of the invention are not limited in this respect. For example, non-content words may be removed using the process illustrated in FIG. 3 and/or simple synonyms may be mapped using the process illustrated in FIG. 4 prior to performing one or both of the cluster analysis processes illustrated in FIGS. 2 and 5. Furthermore, some embodiments of the invention need not employ all of the clustering techniques depicted in FIGS. 2-5, but rather may employ only a subset of one, any two, or any three of the aforementioned clustering techniques. Some embodiments may also include additional clustering techniques not shown in FIGS. 2-5.

As described above, sample clustering may be used to reduce manual processing when generating a training corpus for a statistical natural language understanding model by grouping identical (or similar) transcriptions. Applicants have also appreciated that sample clustering may be used to facilitate updating a grammar for a speech recognition application. A speech recognition application typically uses one or more grammars to constrain the possible sequences of words recognized by the application. However, grammars written by an application developer for a particular application may not include all of the utterances that a user may say in response to interactions with the application, leading to poor speech recognition. Thus, in such systems, speech recognition often is improved by extending the grammar to include additional items that were not included in the original grammar provided by the application developer, but which users have said (or are likely to say) in using the system.

The process of determining how to extend a grammar is often accomplished by presenting a plurality of users with a prompt and recording their responses. Conventionally, each of the responses is manually transcribed and the transcriptions are sent to a parser to compare the responses to the existing grammar to determine which of the responses are not already covered by the grammar. The set of responses that are not covered by the grammar may be analyzed to determine if the grammar should be extended to include additional terms in the unrecognized responses.

In a typical scenario, on the order of one thousand responses or more may be collected to a particular prompt and each of the responses may be manually transcribed to determine whether the grammar can be updated. For example, the prompt may be "Please say "social security number" followed by your social security number." An application developer may specify a grammar for this prompt as follows: "'Social Security Number,' Social, 'SSN,' < >." Accordingly, the speech recognition application using this grammar may be configured to recognize any of the responses that begin with the terms "Social Security Number," "Social," or "SSN." However, if the user says "Social Number," the utterance will not be recognized as being allowable within the grammar. In a directed prompt such as the one described above, it is expected that most of the user responses will be covered by the grammar, with a smaller percentage of the responses not being covered. By collecting a large number of responses, the aforementioned conventional process is able to capture the smaller percentage of user responses not covered by the grammar at the expense of a significant amount of human intervention to transcribe and/or code the user responses.

Figure 6:
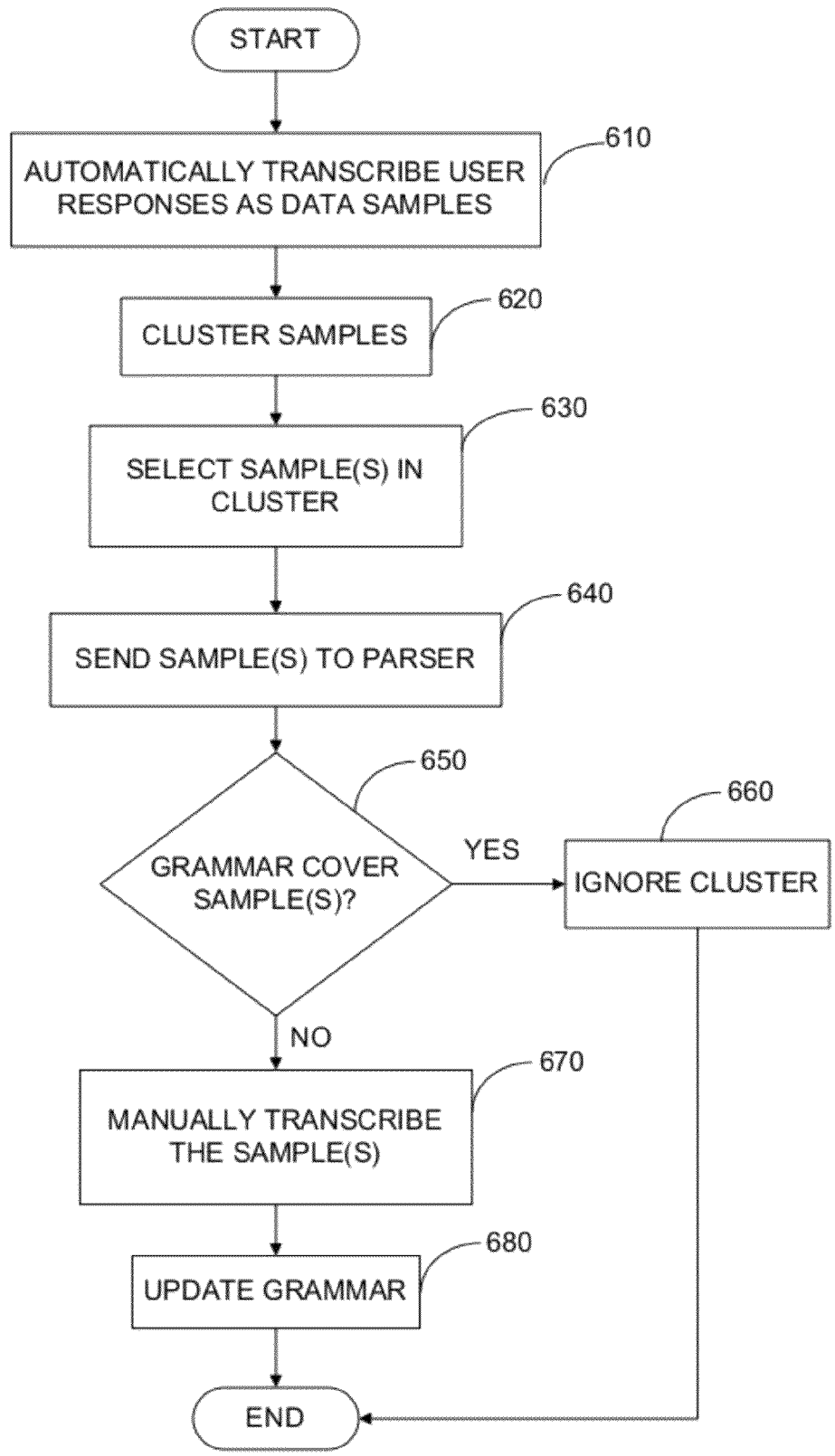
FIG. 6 is a flow chart for updating a grammar in accordance with some embodiments of the invention.

In accordance with one illustrative embodiment, sample clustering may be used to reduce the number of manual transcriptions needed to update a grammar. FIG. 6 shows some illustrative processes for doing so, but it should be appreciated that the embodiments of the invention that relate to clustering to facilitate grammar updating are not limited to this or any particular implementation technique.

In act 610, a plurality of user responses collected in response to a prompt are automatically transcribed into a textual representation using any suitable automatic transcription technique, examples of which are described above. The process then proceeds to act 620, where the plurality of automatic transcriptions (referred to as data samples in FIG. 6) are grouped into clusters. Samples may be grouped into clusters using any suitable techniques. Non-limiting examples of such clustering techniques are described above and one or more rules such as those described above (and/or other suitable rules) may be employed. For example, identical samples, samples that are identical when non-content words are removed, and/or semantically related samples may be grouped into clusters. Once the samples have been clustered, the process proceeds to act 630, where one or more samples in each cluster may be selected as a representative of the cluster. As discussed above, any suitable manner for selecting a representative of a cluster may be used including, but not limited to, randomly selecting the representative sample. Furthermore more than one sample may be selected from each cluster to make the clustering process more robust to "outliers" that may have been improperly included in the cluster. It should be appreciated however, that the number of representative samples that are selected from each cluster is not a limiting aspect of embodiments of the invention, as any suitable number may be selected.

In act 640, the selected sample(s) for each cluster are provided to a parser, which analyzes the selected sample(s) to determine whether they are covered by the existing grammar. In response to some prompts, users may provide responses that are already covered by the grammar, and these responses do not need to be analyzed further. In act 650, the parser determines whether the existing grammar covers the sample(s) that were selected in act 630. If it is determined in act 650 that the grammar covers a sample, the process proceeds to act 660, where the other samples in the cluster are not further processed as it is assumed that they are also covered by the grammar. However, if it is determined in act 650 that the grammar does not cover a sample (i.e., if the sample corresponds to an "out-of-grammar" utterance), the process proceeds to act 670, where the sample is manually transcribed and/or coded to ensure that the automatic transcription process provided an accurate transcription.

In some embodiments, after performing manual processing on the one or more selected samples from each cluster, a weighting factor may be assigned to the one or more selected samples, wherein the weighting factor is based on the number of samples in the cluster to which the selected sample belongs. The weighting factor associated with the manually transcribed sample may be used when updating the grammar, as described below.

In some embodiments, prior to manual transcription and/or coding, the contents of one or more of the out-of-grammar samples may be analyzed to determine whether the manual transcription should be performed. For example, an audio recording associated with the sample may be consulted to determine if the sample corresponds to a user utterance that is noisy and/or includes little or no information that may be used to improve the grammar. In such a case, the sample, despite not being covered by the grammar, may be ignored rather than being manually transcribed. Additionally, in some embodiments, the number of members in a cluster to which an out-of-grammar transcription belongs may be used to determine whether the sample should be manually transcribed or ignored. For example, samples belonging to clusters with one or only a few members may be considered as "outliers," which should not be used to update the grammar, as the sample may have been incorrectly transcribed by the automatic transcription process. Accordingly, such samples may be ignored despite that fact that they are not covered by the grammar. Any suitable threshold regarding the number of required members in a cluster may be used, as embodiments of the invention are not limited in this respect. In some embodiments, rather than ignoring small clusters, a user may be asked to verify whether samples belonging to clusters with fewer members than the threshold value should be used to update the grammar. In response, a user may authorize the updating of the grammar using one or more of the samples in a cluster with a small number of members.

In act 680, the manual transcriptions may be used to update the grammar. Updating the grammar may be performed using any suitable technique including, but not limited to, conventional techniques for updating grammars. In some embodiments, to all manual transcriptions may be used to update the grammar. For example, only manual transcriptions associated with weighting factors larger than a predetermined threshold may be used to update the grammar. By reducing the number of manual transcriptions needed in order to improve the performance of a speech recognition system by extending a grammar employed by the speech recognition system, the amount of human effort that is required may be significantly reduced.

Although the acts in FIG. 6 are depicted and described above as being performed in a particular order, it should be appreciated that the acts may be performed in any order and embodiments of the invention are not limited by the particular order in which the acts are performed. For example, samples associated with noisy audio recordings may be removed before the selected samples are sent to a parser for analysis. Additionally, in some embodiments, samples resulting from automatic transcription of the user responses may be provided to a parser to determine which samples are already covered by the grammar prior to grouping the samples using one or more of the clustering techniques described herein. Although this approach may result in the parser processing more samples, fewer samples may included in the clustering process as samples that are determined to be already covered by the grammar may simply be ignored.

Figure 7:
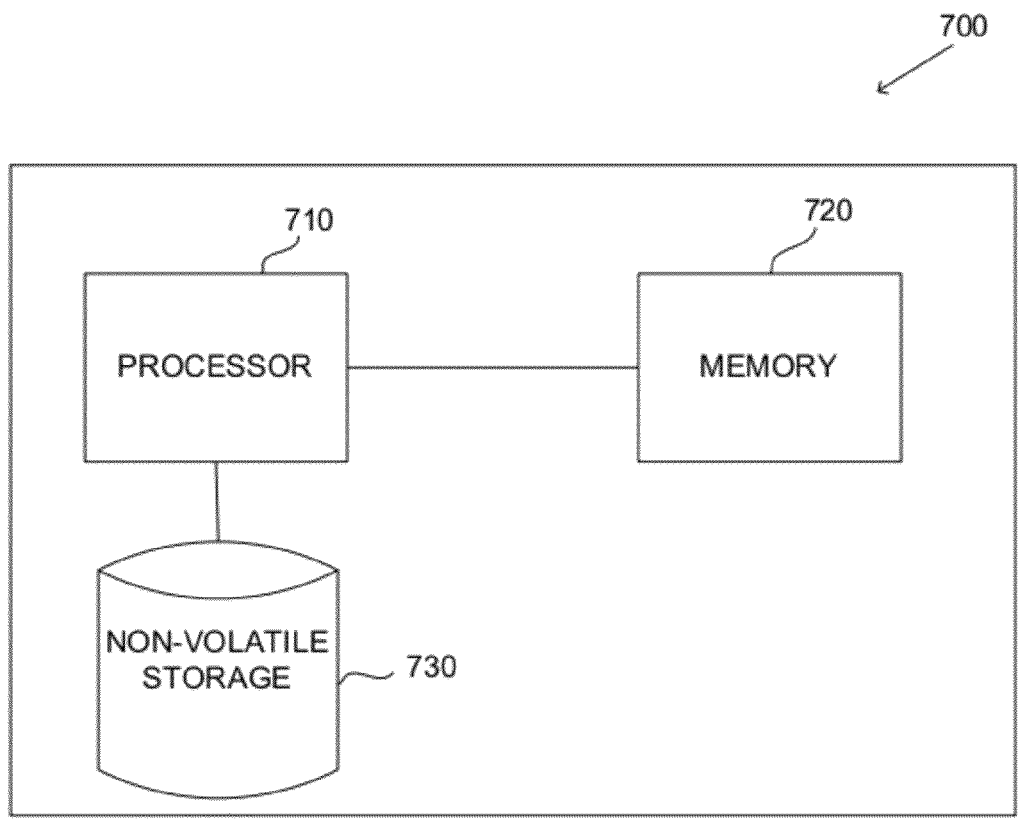
FIG. 7 is an exemplary computer system that may be used in connection with some embodiments of the invention.

An illustrative implementation of a computer system 700 that may be used in connection with any of the embodiments of the invention described herein is shown in FIG. 7. The computer system 700 may include one or more processors 710 and one or more computer-readable non-transitory storage media (e.g., memory 720 and one or more non-volatile storage media 430). The processor 710 may control writing data to and reading data from the memory 720 and the non-volatile storage device 730 in any suitable manner, as the aspects of the present invention described herein are not limited in this respect. To perform any of the functionality described herein, the processor 710 may execute one or more instructions stored in one or more computer-readable storage media (e.g., the memory 720), which may serve as non-transitory computer-readable storage media storing instructions for execution by the processor 710.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of processing a plurality of training samples for an automatic speech recognition (ASR) application, the method comprising acts of:
   forming, using at least one computer processor, at least one cluster from the plurality of training samples, the at least one cluster including a number of the plurality of training samples, wherein the number equals two or more;
   selecting at least one training sample from the at least one cluster;
   obtaining at least one manually-processed data sample resulting from manual processing of the selected at least one training sample in the at least one cluster; and
   assigning, to the at least one manually-processed data sample, a weighting factor based, at least in part, on the number of training samples in the cluster associated with the selected at least one manually-processed data sample.

2. The method of claim 1, wherein selecting at least one training sample comprises selecting a single training sample from the at least one cluster.

3. The method of claim 1, wherein selecting at least one training sample comprises selecting a plurality of training samples from the at least one cluster.

4. The method of claim 3, further comprising:
   determining a number of training samples to select from the at least one cluster based, at least in part, on the number of training samples in the at least one cluster.

5. The method of claim 1, wherein selecting at least one training sample from the at least one cluster comprises selecting at least m training samples from the at least one cluster having N training samples in the cluster, wherein m is determined according to the formula: $m=\log(N)$.

6. The method of claim 1, wherein the act of forming at least one cluster comprises:
   forming the at least one cluster based, at least in part, on a similarity of at least two training samples.

7. The method of claim 1, wherein the act of forming at least one cluster comprises:
   identifying identical training samples in the plurality of training samples; and
   forming the at least one cluster to include the identified identical training samples.

8. The method of claim 1, wherein the act of forming at least one cluster comprises:
   removing at least one non-content word from at least one of the plurality of training samples prior to forming the at least one cluster.

9. The method of claim 1, wherein the act of forming at least one cluster comprises:
   identifying, based, at least in part, on stored data indicating at least one mapping sequence, a simple synonym for a word and/or phrase in at least one of the plurality of transcriptions;
   replacing the identified word and/or phrase with the simple synonym in accordance with the stored at least one mapping sequence; and
   grouping together in the at least one cluster, training samples that match after replacement of the word and/or phrase with the simple synonym.

10. The method of claim 1, wherein the act of forming at least one cluster comprises:
    associating saliency values with words and/or phrases in the plurality of training samples; and
    forming the at least one cluster based, at least in part, on the saliency values associated with the words and/or phrases in the plurality of training samples.

11. The method of claim 1, wherein the act of forming at least one cluster comprises:
    forming a plurality of clusters by processing the plurality of training samples.

12. The method of claim 1, wherein the at least one manually-processed data sample includes a manual annotation for the at least one manually-processed data sample.

13. The method of claim 1, further comprising:
    generating a training corpus, wherein the training corpus includes the at least one manually-processed data sample and its assigned weighting factor.

14. The method of claim 13, further comprising:
    training at least one statistical language model using the training corpus.

15. The method of claim 13, further comprising:
    training at least one call-routing application using the training corpus.

16. At least one non-transitory computer readable storage medium encoded with a plurality of instructions that, when executed by a computer, perform a method of processing a plurality of training samples for an automatic speech recognition (ASR) application, the method comprising acts of:

forming at least one cluster from the plurality of training samples, the at least one cluster including a number of the plurality of training samples, wherein the number equals two or more;

selecting at least one training sample from the at least one cluster;

obtaining at least one manually-processed data sample resulting from manual processing of the selected at least one training sample in the at least one cluster; and assigning, to the at least one manually-processed data sample, a weighting factor based, at least in part, on the number of training samples in the cluster associated with the selected at least one manually-processed data sample.

17. The at least one non-transitory computer readable storage medium of claim 16, wherein the method further comprises:

determining a number of training samples to select from the at least one cluster based, at least in part, on the number of training samples in the at least one cluster.

18. A computer system, comprising:

at least one storage device configured to store a plurality of instructions; and at least one processor programmed to execute the plurality of instructions to perform a method comprising acts of:

forming at least one cluster from the plurality of training samples, the at least one cluster including a number of the plurality of training samples, wherein the number equals two or more;

selecting at least one training sample from the at least one cluster;

obtaining at least one manually-processed data sample resulting from manual processing of the selected at least one training sample in the at least one cluster; and assigning, to the at least one manually-processed data sample, a weighting factor based, at least in part, on the number of training samples in the cluster associated with the selected at least one manually-processed data sample.

19. The computer system of claim 18, wherein the method further comprises an act of:

generating a training corpus, wherein the training corpus includes the at least one manually-processed data sample and its assigned weighting factor.

20. The computer system of claim 19, wherein the method further comprises an act of:

implementing at least one call routing application; and training the at least one call routing application and/or a language model associated with the at least one call routing application with the training corpus.

21. A method for updating a grammar using a plurality of data samples, the method comprising:

forming, with at least one processor, a cluster including at least two data samples of the plurality of data samples based, at least in part, on a similarity between the at least two data samples;

selecting at least one data sample from the cluster;

determining whether the at least one data sample is covered by the grammar; and updating the grammar based, at least in part, on the at least one data sample, when it is determined that the at least one data sample is not covered by the grammar.

22. The method of claim 21, further comprising:

receiving a manual transcription of the at least one data sample; and updating the grammar based, at least in part on the manual transcription.

23. The method of claim 22, further comprising:

identifying at least one substring in the manual transcription; and updating the grammar based, at least in part, on the at least one substring.

24. The method of claim 21, wherein the plurality of data samples are transcriptions of audio samples.

25. The method of claim 21, further comprising:

transcribing a plurality of training samples to produce the plurality of data samples.

26. The method of claim 21, wherein the method further comprises:

forming a plurality of clusters by processing the plurality of data samples.

* * * * *